United States Patent
Eberle et al.

(10) Patent No.: US 9,561,823 B2
(45) Date of Patent: Feb. 7, 2017

(54) MOTOR VEHICLE REAR END

(71) Applicant: Dr. Ing. h.c. F. Porsche Aktiengesellschaft, Stuttgart (DE)

(72) Inventors: Wilfried Eberle, Ehingen (DE); Herbert Klamser, Korntal-Muenchingen (DE); Franz-Rudolf Wierschem, Weissach (DE); Gerald Hekmann, Ludwigsburg (DE); Daniel Haag, Stuttgart (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 14/681,275

(22) Filed: Apr. 8, 2015

(65) Prior Publication Data

US 2015/0291217 A1    Oct. 15, 2015

(30) Foreign Application Priority Data

Apr. 11, 2014   (DE) ........................ 10 2014 105 204

(51) Int. Cl.
| | |
|---|---|
| *B62D 21/15* | (2006.01) |
| *B60K 1/04* | (2006.01) |
| *B62D 25/08* | (2006.01) |

(52) U.S. Cl.
CPC ............ *B62D 21/152* (2013.01); *B60K 1/04* (2013.01); *B62D 25/087* (2013.01); *B60K 2001/0416* (2013.01); *B60Y 2306/01* (2013.01)

(58) Field of Classification Search
CPC ............. B60K 1/04; B60K 2001/0416; B60Y 2306/01; B62D 21/152; B62D 25/087
See application file for complete search history.

(56) References Cited

U.S. PATENT DOCUMENTS 3,595,335 A * 7/1971 Wessells, III ........ B62D 25/087
                                                            180/232
6,062,632 A * 5/2000 Brachos .................. B60R 19/00
                                                         296/187.03
(Continued)

FOREIGN PATENT DOCUMENTS

DE             3141164 A1 * 4/1983  ............... B60K 1/04
DE        100 62 689     7/2002
(Continued)

OTHER PUBLICATIONS

German Search Report of Nov. 18, 2014.

*Primary Examiner* — Glenn Dayoan
*Assistant Examiner* — Paul Chenevert
(74) *Attorney, Agent, or Firm* — Gerald E. Hespos; Michael J. Porco; Matthew T. Hespos

(57) ABSTRACT

A motor vehicle rear end has left and right longitudinal beams (12, 14) forming load-bearing structures of the vehicle, and a receiving housing (18) is between the left and right longitudinal beams (12, 14) for accommodating a traction battery. The receiving housing (18) has left and right side walls (22, 24) and a central wall (26) running in a forward direction of travel. An impact profile (26) is connected to the longitudinal beams (12, 14) at the level of the receiving housing (18) and absorbs impact energy in the event of a rear-end crash. The impact profile (26) has a left and right predetermined buckling points (36, 38) that enable the impact profile (26) to buckle toward the receiving housing (18) in a rear-end crash. The impact profile (26) that buckles in a rear-end crash strikes the receiving housing (18) along the longitudinal extent of the central wall (25).

10 Claims, 3 Drawing Sheets

(56) References Cited

U.S. PATENT DOCUMENTS

| | | | | |
|---|---|---|---|---|
| 7,568,755 | B2* | 8/2009 | Imada | B62D 21/152 |
| | | | | 296/187.11 |
| 8,328,272 | B2* | 12/2012 | Fujimura | B62D 25/2027 |
| | | | | 296/187.11 |
| 9,126,637 | B2* | 9/2015 | Eberle | B60K 1/04 |
| 9,308,805 | B2* | 4/2016 | Shiromura | B60K 1/04 |
| 2005/0077756 | A1* | 4/2005 | Matsuda | B62D 21/152 |
| | | | | 296/203.02 |
| 2006/0001228 | A1 | 1/2006 | Yoshimura | |
| 2013/0249243 | A1 | 9/2013 | Lee et al. | |
| 2015/0214522 | A1* | 7/2015 | Muck | B60K 1/04 |
| | | | | 429/120 |
| 2015/0273996 | A1* | 10/2015 | Onodera | B60K 1/04 |
| | | | | 429/100 |

FOREIGN PATENT DOCUMENTS

| | | | | |
|---|---|---|---|---|
| DE | 1 424 266 | | 6/2004 | |
| DE | 102008059973 | A1 * | 6/2010 | H01M 2/1077 |
| DE | 10 2013 204 757 | | 9/2013 | |
| DE | 102013007588 | A1 * | 11/2014 | B62D 25/087 |
| DE | 102013114310 | A1 * | 6/2015 | B60K 1/04 |
| FR | EP 0574281 | A1 * | 12/1993 | B60K 1/04 |
| FR | EP 1930230 | A1 * | 6/2008 | B62D 21/152 |
| FR | 3014809 | A1 * | 6/2015 | B62D 21/152 |
| JP | 2003154907 | A | 5/2003 | |
| JP | 2013-14312 | | 1/2013 | |
| JP | 2013018430 | A | 1/2013 | |

* cited by examiner

MOTOR VEHICLE REAR END

CROSS REFERENCE TO RELATED APPLICATION

This application claims priority under 35 USC 119 to German Patent Appl. No. 10 2014 105 204.8 filed on Apr. 11, 2014, the entire disclosure of which is incorporated herein by reference.

BACKGROUND

1. Field of the Invention

The invention relates to a rear end for a motor vehicle with a compartment to position articles, such as a traction battery.

2. Description of the Related Art

US 2006/0001228 A1 discloses a motor vehicle rear end with longitudinal beams running in the direction of travel. The longitudinal beams define a load-bearing structure of the motor vehicle and are equipped with vertical slots. The slots introduce a deliberate material weakening into the respective longitudinal beam so that the longitudinal beam can collapse in a defined manner, without excessive transverse bulging in the event of a rear-end collision.

DE 10 2013 204 757 A1 discloses a motor vehicle rear end with a motor vehicle battery arranged in the rear-end region. An impact frame is provided between a bumper and the motor vehicle battery to absorb impact energy in the event of a rear-end crash and hence to protect the motor vehicle battery. A rear end of the impact frame has a rear-end arch connected via deformable longitudinal structures to a trapezoidal front arch. The front arch has a part running parallel to the motor vehicle battery in a transverse direction. This transverse part is connected to longitudinal beams of the motor vehicle via connecting pieces that run oblique to the longitudinal direction of the motor vehicle so that the front arch engages around a part of the motor vehicle battery.

There is a constant need for sensitive articles in a motor vehicle to be protected against damage with little structural outlay.

It is the object of the invention to protect sensitive articles in a motor vehicle, such as a traction battery, from damage in the event of a rear-end crash, without a large structural outlay.

SUMMARY OF THE INVENTION

The invention relates to a motor vehicle rear end for a motor vehicle having left and right longitudinal beams that form load-bearing structures of the motor vehicle and a receiving housing arranged between the left and right longitudinal beams for accommodating battery cells of a traction battery. The receiving housing has left and right side walls that run substantially in a forward direction of travel, and at least one central wall between the left and right side walls also runs substantially in the forward direction of travel. An impact profile is connected to the left and right longitudinal walls at the level of the receiving housing and functions to absorb impact energy in the event of a rear-end crash. The impact profile has predetermined left and right buckling points that enable the impact profile to buckle in the direction of the receiving housing in the event of a rear-end crash. The impact profile that is buckled in the event of a rear-end crash strikes the receiving housing along the longitudinal extent of the central wall.

In the event of a rear-end crash, for example in the event of a collision of two vehicles, the impact profile can dissipate the impact energy, and/or absorb the impact energy by plastic deformation. Reinforcement elements can be connected to the impact profile, in the manner of a console, and can be supported on the left and right longitudinal beams. The reinforcement elements also can absorb impact energy by plastic deformation. However, in the event of a particularly severe rear-end crash, the impact profile can be deformed sufficiently to strike the receiving housing. In this case, it is possible for the impact profile, via the respective reinforcement element, to strike a rear wall of the receiving housing along the longitudinal extent of the left and/or right side walls so that impact energy that is not absorbed by the impact profile can be conducted into the respective side wall of the receiving housing. The side wall, in turn, can dissipate the impact energy to the load-bearing structure of the motor vehicle.

The left and right predetermined buckling points enable the impact profile to realize a defined buckling about two buckling axes in the event of a severe rear-end crash. The left and right predetermined buckling points form substantially vertical buckling axes about which a part of the impact profile running between the predetermined buckling points can pivot. In this way, buckling of the impact profile at the left and right predetermined buckling points enables the part of the impact profile that runs between the predetermined buckling points to buckle toward the receiving housing during the rear-end crash. This defined buckling of the impact profile is achieved with the aid of the predetermined buckling point in the event of a rear-end crash, and enables the impact profile to strike a rear wall of the receiving housing along the longitudinal extent of the central wall. Thus, impact energy not absorbed by the impact profile can be conducted into the central wall of the receiving housing, and the central wall, in turn, can dissipate the impact energy to the load-bearing structure of the motor vehicle. In this way, impact energy introduced into the rear wall of the receiving housing is eliminated or at least reduced to such an extent that, in the event of a rear-end crash, for example with a speed difference of 50 km/h, the rear wall of the receiving housing is not pushed sufficiently into the interior of the receiving housing to damage a traction battery for purely electric drive of a motor vehicle, and/or a battery cell, arranged in the receiving housing. Instead, the impact energy can be dissipated to the central wall, bypassing those parts of the rear wall that bend more easily than the fastening points of the rear wall.

Impact energy generated in the event of a rear-end crash exerts loads in the longitudinal direction on the central wall and possibly the side wall. The central wall acts substantially as a compression strut in relation to the rear wall so that high forces can be dissipated without component failure. Furthermore, the central wall is part of a box-like structure and is braced at multiple points along its longitudinal direction, at least at an upper and/or lower edge. Thus, the central wall is rigid and fails only in the presence of a high buckling load. The prevention of bulging or buckling of the central wall enables a receiving frame to be provided laterally adjacent both sides of the central wall for accommodating a multiplicity of battery cells. In the event of a particularly severe rear-end crash, impact energy not absorbed by the impact profile can be conducted initially to the central wall of the receiving housing by the buckling of the impact profile about the left and right predetermined buckling points and then can be dissipated further to the load-bearing structure. Thus, articles in the receiving housing will not be damaged by deformation of the receiving housing. Accordingly, a traction battery or other sensitive articles can be protected against damage with little structural outlay.

Each predetermined buckling point may be configured as a slot formed into the volume of the impact profile. The predetermined buckling point may extend over the entire vertical height of the impact profile or may be only in a sub-region of the maximum vertical height of the impact profile. The predetermined buckling point may be provided in the impact profile by a cutting process, for example by milling. Upper and lower longitudinal sides of a hollow impact profile preferably left undamaged by the predetermined buckling point. A rear side pointing away from the receiving housing of the impact profile also can be left undamaged by the predetermined buckling point. The predetermined buckling point may be a recess formed, for example, by milling in a front side pointing toward the receiving housing. Material reinforcements, for example webs of a chamber profile that were provided between the cutout in the front and rear sides likewise are recessed by the predetermined buckling point.

The impact profile may, similar to a bumper, be part of a strut structure running in a transverse direction, and thus may not part of a frame structure. In this way, two or more components that run in a transverse direction and that are connected to one another in the manner of a frame by means of intermediate pieces running in a longitudinal direction are eliminated, and it is unnecessary for a frame structure to be connected to the longitudinal beams. In this way, the structural space requirement can be very small, and even already-constructed motor vehicles can be retrofitted inexpensively. The receiving housing can be a battery housing of a traction battery that contains multiple battery cells. The load-bearing structure may be part of a chassis or vehicle frame and may be configured as a load-bearing component for dissipating loads that occur during the operation of the motor vehicle.

The left and right predetermined buckling points may be spaced from the central wall in opposite horizontal transverse directions by substantially equal distances. In this way, in the event of buckling of the impact profile, a maximum of the buckled region of the impact profile in relation to a longitudinal extent of the impact profile can strike the receiving housing in the imaginary projection of the central wall. Thus, the impact profile can strike in the projection of the central wall even in the event of not exactly simultaneous buckling of the impact profile in the region of the predetermined buckling points, for example in the event of a slightly oblique impact against the motor vehicle rear end.

A deformation element, such as a crash box, may be provided between the central wall and the impact profile along the longitudinal extent of the central wall. In the event of a sufficiently severe rear-end crash, the deformation element can be deformed between the central wall and the impact profile to absorb additional impact energy.

The deformation element particularly preferably has a force introduction surface area $A_E$ pointing toward the impact profile and has a force exit surface area $A_A$ pointing toward the central wall, wherein $1.0<A_E/A_A$, in particular $1.5 \leq A_E/A_A \leq 5.0$, preferably $2.0 \leq A_E/A_A \leq 4.0$ and particularly preferably $A_E/A_A = 3.0 \pm 0.5$. In this way, the deformation element can easily compensate for offsets occurring during a plastic deformation of the impact profile, and introduce the occurring forces into the central wall substantially in a longitudinal direction.

The impact profile and/or the deformation element may be in the form of a chamber profile with multiple chambers. The chambers may be formed by substantially vertically running channels. The individual chambers can be deformed plastically in the event of a rear-end crash so that at least a part of the impact energy can be absorbed. In this way, a significantly large part of the impact energy can be absorbed by the impact profile and/or by the deformation element by plastic deformation of the chambers so that lower forces are introduced into the side wall and/or into the central wall.

The impact profile and/or the deformation element may be an extruded profile, such as an extruded aluminum profile, and hence can be produced inexpensively from a lightweight material. The impact profile and/or the deformation element can be configured with a cross-sectional surface area suitable for absorbing impact energy. The cross-sectional surface area may have struts running within an outer hollow profile.

The impact profile may have a convex, in particular arcuate, profile counter to the forward direction of travel. In the event of a rear-end crash, the impact profile can be pushed in the forward direction of travel so that rigidity can be increased. The impact profile can thus absorb and/or dissipate a correspondingly high level of impact energy until the impact profile can buckle in the direction of the receiving housing by deliberate component failure at the predetermined buckling points.

The left and right side walls may be connected to one another by a rear wall. A left protective bracket for connecting the rear wall to the supporting structure may be inserted by at least one deformable lug into at least one hollow chamber on a left side of the rear wall, and/or a right protective bracket for connecting the rear wall to the supporting structure may be inserted by at least one deformable lug into at least one hollow chamber on a right side of the rear wall. The lug of the left protective bracket is arranged between the left side wall and the impact profile along the longitudinal extent of the left side wall, and/or the lug of the right protective bracket is arranged between the right side wall and the impact profile along the longitudinal extent of the right side wall. The respective protective brackets enable a part of the forces arriving at the receiving housing in the event of a rear-end crash to be dissipated to the supporting structure, thereby avoiding an unnecessarily high load on the respective side wall. The deformable lug also enables the respective protective bracket to absorb impact energy by plastic deformation and protect the associated side wall.

The lug may be formed by a bent-over tab that may be of substantially U-shape. The bent-over tab thus forms a chamber that is open on one side and can be deformed plastically to absorb impact energy in the event of a rear-end crash. The deformable lug can be produced inexpensively and easily. Multiple deformable lugs can be provided, for example in a comb-like manner, and may protrude in a transverse direction from a substantially vertically running strut. One lug may be inserted into respective chambers of the rear wall configured as a chamber profile.

The receiving housing can be inserted into a receiving depression formed by a motor vehicle body. The receiving depression can block outward bulging of the side wall in the event of a rear-end crash so that buckling of the side wall can be prevented.

The invention is explained below by way of example with reference to the appended drawings and on the basis of preferred embodiments. Each feature discussed below may constitute an aspect of the invention both individually and in combination.

DETAILED DESCRIPTION

Figure 1:
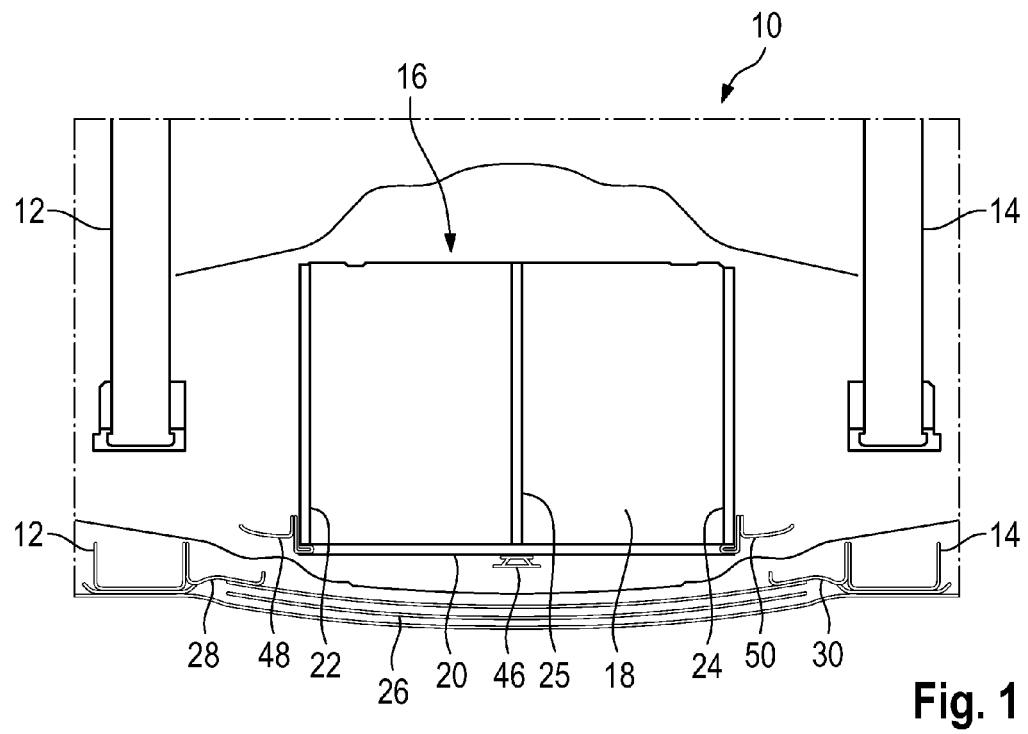
FIG. 1 is a schematic plan view of a motor vehicle rear end.
Figure 2:
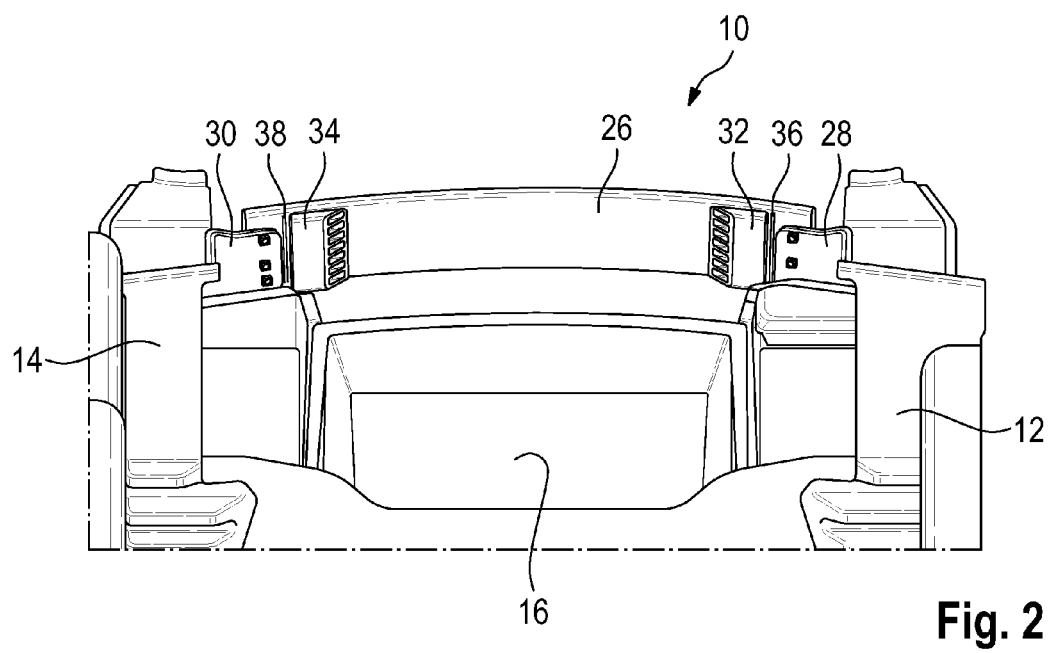
FIG. 2 is a schematic perspective view of the motor vehicle rear end of FIG. 1.

The motor vehicle rear end 10 illustrated in FIGS. 1 and 2 has left and right longitudinal beams 12 and 14 of a load-bearing structure of a motor vehicle. A receiving depression 16 is formed between the left and right longitudinal beams 12 and 14, and a receiving housing 18 of a traction battery is arranged in the receiving depression 16. The receiving housing 18 is of box-like substantially cuboidal form and has a rear wall 20 connected to left and right side walls 22 and 24. In the exemplary embodiment illustrated, a central wall 25 is provided substantially centrally between the left and right side walls 22 and 24. Battery cells of the traction battery can be provided between the central wall 25 and the left and right side walls 22 and 24.

An impact profile 26 is provided to protect the battery cells of the traction battery in the receiving housing 18 in the event of a rear-end crash. The impact profile 26 is convex in the direction of the rear end and is connected by a substantially angular left console 28 to the left longitudinal beam 12 at an inner side and by a substantially angular right console 30 to the right longitudinal beam 14 at an inner side. A left reinforcement element 32 is connected to the impact profile 26 behind the left side wall 22 in the longitudinal direction and a right reinforcement element 34 is connected to the impact profile 26 behind the right side wall 24 in the longitudinal direction. The reinforcement elements 32, 34 extend substantially over the same vertical height as the impact profile 26. In the event of a severe rear-end crash, with deformation of the impact profile 26, a part of the impact energy can be dissipated via the reinforcement elements 32, 34 to the side walls 22, 24 so that substantially no impact energy arrives at the rear wall 20.

Figure 3:
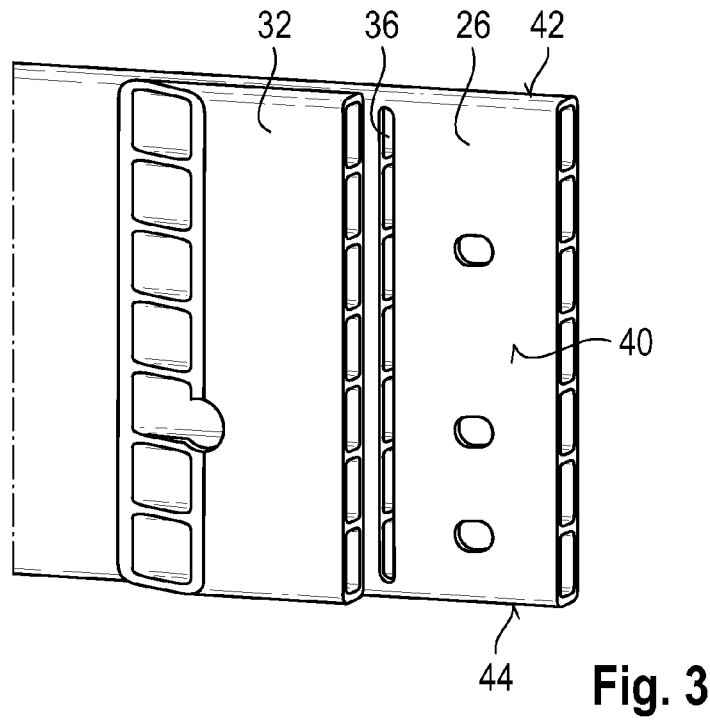
FIG. 3 is a schematic detail view of an impact profile of the motor vehicle rear end of FIG. 2.

A left predetermined buckling point 36 is formed in the impact profile 26 between the left reinforcement element 32 and the left console 28, and a right predetermined buckling point 38 is formed in the impact profile 26 between the right reinforcement element 34 and the right console 30. As illustrated in FIG. 3, the respective predetermined buckling points 36, 38 can be formed into the impact profile 26 in the form of a chamber profile by milling, with the individual webs of the chamber profile and a cutout in a front side 40 being milled out. A rear side and an upper longitudinal side 42 and a lower longitudinal side 44 of the impact profile 26 are left undamaged. The predetermined buckling points 36, 38 enable the impact profile 26 to undergo deliberate component failure at the predetermined buckling points 36, 38 by buckling in the event of a sufficiently severe rear-end crash so that the impact profile 26 buckles inward in the direction of the receiving housing. In this way, the impact profile 26 can, in an imaginary projection of the central wall 25 along the longitudinal extent of the central wall 25, introduce forces into the receiving housing 18 at a location where a part of the impact energy can also be dissipated via the central wall 25 without the rear wall 20 buckling and without the battery cells being damaged.

Figure 4:
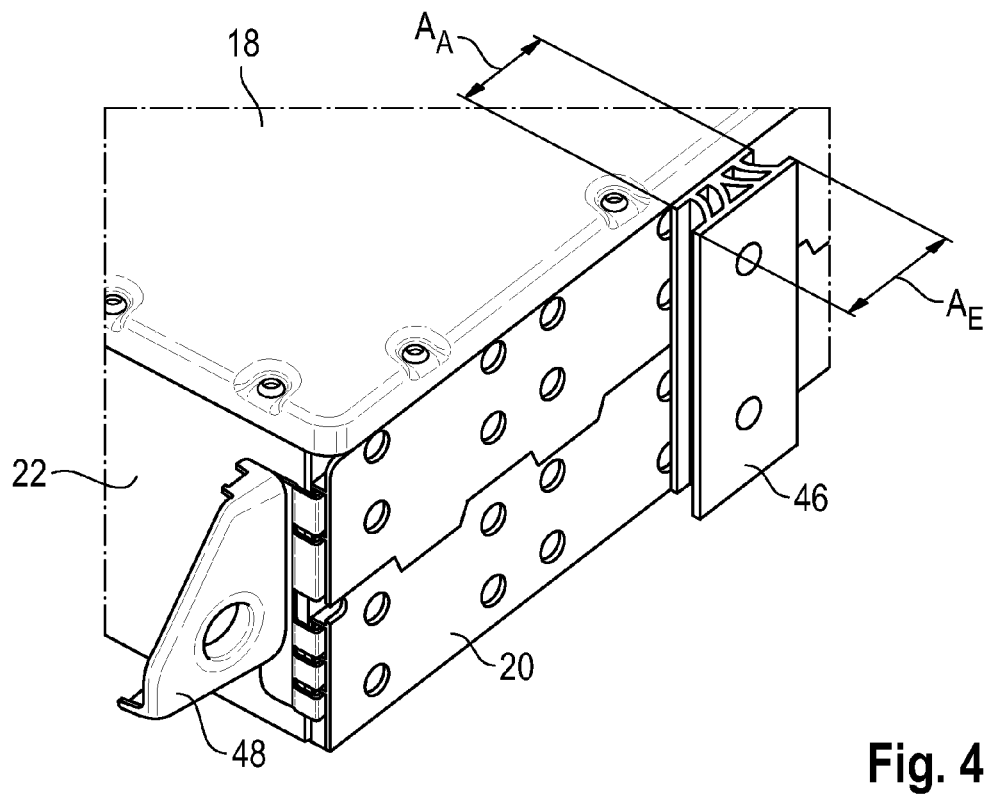
FIG. 4 is a schematic perspective view of a part of a receiving housing for the motor vehicle rear end from FIG. 1.

As illustrated in FIG. 4, a deformation element 46 in the form of a chamber profile can be provided between the central wall 25 and the impact profile 26. The deformation element 46 has a force introduction surface area AE, pointing toward the impact profile 26 for introducing impact energy, and a force exit surface area AA, pointing toward the receiving housing 18, for dissipating impact energy to the central wall. The force introduction surface area AE is larger than the force exit surface area AA.

Figure 5:
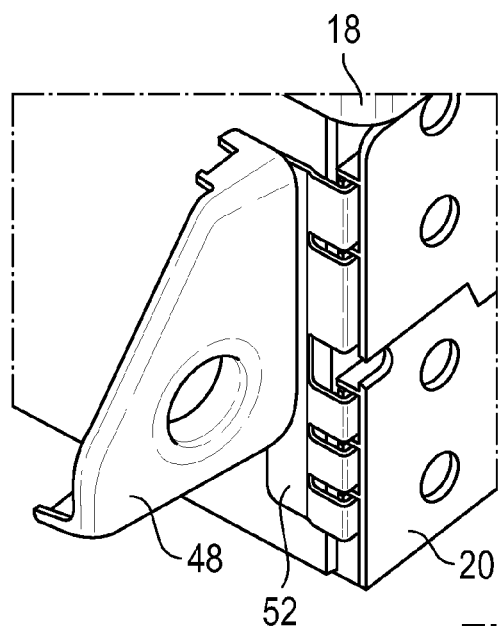
FIG. 5 is a schematic detail view of the receiving housing from FIG. 4.
Figure 6:
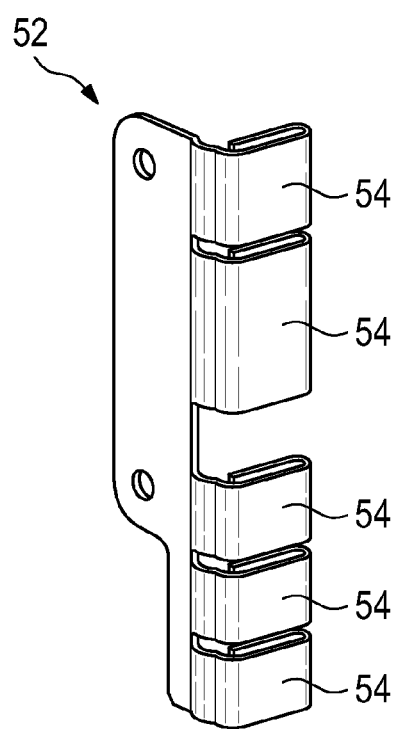
FIG. 6 is a schematic perspective view of a holding element of a protective bracket for the receiving housing from FIG. 4.

As illustrated in FIG. 5, left and right protective brackets 48 and 50 engage into chambers of the rear wall 20 of the receiving housing 18 and dissipate part of the impact energy arriving at the receiving housing 18. The protective brackets 48, 50 may have holding elements 52 that are of substantially comb-like form. As illustrated in FIG. 6, the holding element 52 may have multiple deformable lugs 54 that may be formed by bent-over tabs. In the event of a rear-end crash, the lugs 54 can deform and thus absorb a part of the impact energy.

What is claimed is:

1. A motor vehicle rear end, comprising:
   left and right longitudinal beams defining load-bearing structures of the motor vehicle;
   a receiving housing arranged between the left and right longitudinal beams, the receiving housing having left and right side walls running substantially in a forward direction of travel, and at least one central wall between the left and right side walls and running substantially in the forward direction of travel;
   an impact profile connected to the left and right longitudinal beams at a level of the receiving housing for absorbing impact energy in an event of a rear-end crash, the impact profile having a left and right predetermined buckling points configured to enable the impact profile to buckle toward the receiving housing in the event of a rear-end crash, wherein the impact profile that buckles in the event of a rear-end crash strikes the receiving housing along a longitudinal extent of the central wall; and
   a deformation element between the central wall and the impact profile along the longitudinal extent of the central wall, wherein at least one of the impact profile and the deformation element is in the form of a chamber profile with multiple chambers formed by substantially vertically running channels.

2. The motor vehicle rear end of claim 1, wherein the deformation element has a force introduction surface area $A_E$ pointing toward the impact profile and has a force exit surface area $A_A$ pointing toward the central wall, wherein $1.5 \leq A_E/A_A \leq 5.0$.

3. A motor vehicle rear end of claim 1, comprising:
   left and right longitudinal beams defining load-bearing structures of the motor vehicle;
   a receiving housing arranged between the left and right longitudinal beams, the receiving housing having left and right side walls running substantially in a forward direction of travel, and at least one central wall between the left and right side walls and running substantially in the forward direction of travel; and
   an impact profile connected to the left and right longitudinal beams at a level of the receiving housing for absorbing impact energy in an event of a rear-end crash, the impact profile having a left and right predetermined buckling points configured to enable the impact profile to buckle toward the receiving housing in the event of a rear-end crash, wherein the impact profile that buckles in the event of a rear-end crash strikes the receiving housing along a longitudinal extent of the central wall; and wherein the receiving housing further comprises a rear wall having opposite left and right ends, left and right protective brackets connected to deformable lugs that are inserted into hollow chambers provided respectively on left and right ends of the rear wall, the left and right protective brackets connecting the rear wall to the left and right side walls respectively, the lugs of the left protective bracket being between the left side wall and the impact profile, and the lug of the right protective bracket being between the right side wall and the impact profile.

4. The motor vehicle rear end of claim 3, wherein the left and right predetermined buckling points are spaced apart in opposite horizontal transverse directions from the central wall by substantially equal distances.

5. The motor vehicle rear end of claim 3, further comprising a deformation element between the central wall and the impact profile along the longitudinal extent of the central wall.

6. The motor vehicle rear end of claim 3, wherein each of the lugs is a bent-over tab of substantially U-shaped configuration.

7. A motor vehicle rear end, comprising:
left and right longitudinal beams defining load-bearing structures of the motor vehicle;
a receiving housing arranged between the left and right longitudinal beams, the receiving housing having left and right side walls running substantially in a forward direction of travel, and at least one central wall between the left and right side walls and running substantially in the forward direction of travel; and
an impact profile connected to the left and right longitudinal beams at a level of the receiving housing for absorbing impact energy in an event of a rear-end crash, the impact profile having a left and right predetermined buckling points configured to enable the impact profile to buckle toward the receiving housing in the event of a rear-end crash, the left and right predetermined buckling points being spaced apart in opposite horizontal transverse directions from the central wall by substantially equal distances;
a deformation element between the central wall and the impact profile along the longitudinal extent of the central wall, the deformation element having a force introduction surface area $A_E$ pointing toward the impact profile and having a force exit surface area $A_A$ pointing toward the central wall, wherein $1.5 \leq A_E/AA \leq 5.0$, wherein the impact profile that buckles in the event of a rear-end crash strikes the receiving housing along a longitudinal extent of the central wall.

8. The motor vehicle rear end of claim 7, wherein at least one of the impact profile and the deformation element is in the form of an extruded profile.

9. The motor vehicle rear end of claim 7, wherein the impact profile has a profile that is arcuately convex counter to the forward direction of travel.

10. The motor vehicle rear end of claim 1, wherein the receiving housing is inserted into a receiving depression formed by a motor vehicle body.

* * * * *